(12) United States Patent
Tesavis

(10) Patent No.: US 7,142,335 B2
(45) Date of Patent: Nov. 28, 2006

(54) METHOD AND APPARATUS FOR TRANSPARENCY SCANNING WITH A DUPLEX REFLECTIVE SCANNER

(75) Inventor: Carl J. Tesavis, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 883 days.

(21) Appl. No.: 10/201,677

(22) Filed: Jul. 22, 2002

(65) Prior Publication Data

US 2004/0012825 A1    Jan. 22, 2004

(51) Int. Cl.
H04N 1/04    (2006.01)

(52) U.S. Cl. .............. 358/474; 358/505; 358/448; 358/493; 250/208.1

(58) Field of Classification Search ........... 358/474, 358/505, 448, 447, 496, 494, 493; 250/208.1
See application file for complete search history.

(56) References Cited

U.S. PATENT DOCUMENTS

| | | | |
|---|---|---|---|
| 4,419,007 A * | 12/1983 | Kingsley | 399/85 |
| 4,536,077 A * | 8/1985 | Stoffel | 358/497 |
| 4,816,903 A | 3/1989 | Utsuda et al. | |
| 4,989,099 A * | 1/1991 | Koshiyouji et al. | 358/474 |
| 5,282,064 A | 1/1994 | Yamada | |
| 5,381,245 A | 1/1995 | Johnston et al. | |
| 5,450,215 A | 9/1995 | Iwama | |
| 5,457,547 A | 10/1995 | Yamada | |
| 5,463,217 A | 10/1995 | Sobol et al. | |
| 5,483,356 A | 1/1996 | Chen et al. | |
| 5,606,450 A | 2/1997 | Chen | |
| 5,608,547 A | 3/1997 | Nakatani et al. | |
| 5,650,863 A | 7/1997 | Utagawa et al. | |
| 5,652,469 A | 7/1997 | Boardman et al. | |
| 5,673,125 A * | 9/1997 | Merecki et al. | 358/487 |
| 5,677,777 A | 10/1997 | Tsai | |
| 5,696,609 A | 12/1997 | Cresens et al. | |
| 5,710,425 A | 1/1998 | McConica | |
| 5,710,643 A | 1/1998 | Depiano | |
| 5,726,790 A | 3/1998 | Tsai | |
| 5,751,447 A | 5/1998 | Brook et al. | |
| 5,814,809 A * | 9/1998 | Han | 250/208.1 |
| 5,818,611 A | 10/1998 | Shih | |
| 5,822,087 A | 10/1998 | Tsai | |
| 5,850,297 A | 12/1998 | Honda | |
| 5,875,269 A | 2/1999 | Yamashita et al. | |
| 5,883,727 A | 3/1999 | Tsai | |

(Continued)

Primary Examiner—Douglas Q. Tran
Assistant Examiner—Negussie Worku
(74) Attorney, Agent, or Firm—Nelson Adrian Blish

(57) ABSTRACT

The scanning method of the invention enables a user to scan transparencies with a duplex scanner having a moveable camera, and a mirror or light source associated with the camera on each side of the document path. The scanner, in its normal mode of operation, is a duplex reflective scanner which means the image, per side, is captured by reflecting light from a light source located on the same side of an opaque flat object as the CCD of the camera that captures the image. In order to scan transparencies, a mechanism is provided which allows an opposing camera light source to be aligned (moved at runtime) with the aperture of the camera opposite the opposing camera light source. This allows the light of the opposing camera light source to project through a transparent object while the opposite camera CCD captures an image of the transparency. The opposite camera, which captures the image, has its light source turned off while in the transparent scanning mode.

17 Claims, 1 Drawing Sheet

U.S. PATENT DOCUMENTS

| | | |
|---|---|---|
| 5,907,411 A | 5/1999 | Han |
| 5,946,427 A | 8/1999 | Kanemitsu |
| 5,959,746 A | 9/1999 | Tsai |
| 5,966,221 A | 10/1999 | Tellam et al. |
| 6,018,161 A | 1/2000 | Batten et al. |
| 6,043,906 A | 3/2000 | Kikuchi |
| 6,054,707 A | 4/2000 | Hou |
| 6,075,584 A | 6/2000 | Tsai |
| 6,122,077 A * | 9/2000 | Kaji .......................... 358/448 |
| 6,229,628 B1 | 5/2001 | Takeuchi |
| 6,233,063 B1 | 5/2001 | Bernasconi et al. |
| 6,243,185 B1 | 6/2001 | Lin et al. |
| 6,252,684 B1 * | 6/2001 | Lin .......................... 358/498 |
| 6,259,540 B1 | 7/2001 | Hsu et al. |
| 6,304,358 B1 | 10/2001 | Lin et al. |
| 6,965,460 B1 * | 11/2005 | Gann et al. ................. 358/471 |

* cited by examiner

METHOD AND APPARATUS FOR TRANSPARENCY SCANNING WITH A DUPLEX REFLECTIVE SCANNER

FIELD OF THE INVENTION

This invention relates in general to document and/or pictorial scanners and in particular to duplex reflective scanners having a transparency scanning mode. It would be convenient for a duplex reflective scanner to be able to scan transparent documents.

BACKGROUND OF THE INVENTION

In duplex reflective scanners capable of capturing an image from the front and rear of a document there is a camera and light source for each side. In this type of scanner the light source and camera aperture for one side are offset from the camera aperture for the other side so that the effects of light and thus image data bleeding through from the opposing side is minimized. Such a technique precludes scanning transparent documents since transparency scanning requires light being sourced from the side opposite from the charged coupled device (CCD) capturing the image.

U.S. Pat. No. 6,252,684 discloses one method of scanning transparencies in a simplex scanner. This method, however, relies on an additional lamp specifically for the purpose of transparency scanning. Much of the prior art enables transparency scanning on reflective simplex platen type scanners, for example see U.S. Pat. Nos. 5,381,245; 5,818,611; 5,822,087; 5,673,125; 5,677,777; and 5,726,790.

SUMMARY OF THE INVENTION

The scanning method according to the invention provides a means to scan transparencies with a duplex scanner with a moveable camera, mirror or light source associated with the camera on one side of the document path. The scanner according to the present invention, in its normal mode of operation, is a duplex reflective scanner. This means the image, per side, is captured by reflecting light from a source located on the same side of an opaque flat object, for example a piece of paper, as the CCD captures the image. In the present invention, there is a mechanism which allows the opposing first cameras light source to be aligned (moved at runtime) with the aperture of the second camera. This allows the light of the first camera to project through a transparent object while a second camera CCD captures an image of the transparency. The second camera, which captures the image, has its light source turned off while in the transparent scanning mode. Additional hardware is not required for duplex transparency scanning.

There are several advantages in this novel scanning method and apparatus invention. For example, scanning when performed according the instant invention enables a reflective scanner to scan transparencies while not adding cost to the base duplex scanner. Additionally, scanning efficiency is gained by allowing the scanner to switch between reflective and transparency mode programmatically at run time using the existing lamp of the other camera, i.e., by using the cameras CCDs as a sensor the scanner will be able to switch modes on the fly with-in a batch scanning process.

The invention and its objects and advantages will become more apparent in the detailed description of the preferred embodiment presented below.

DETAILED DESCRIPTION OF THE INVENTION

Figure 1:
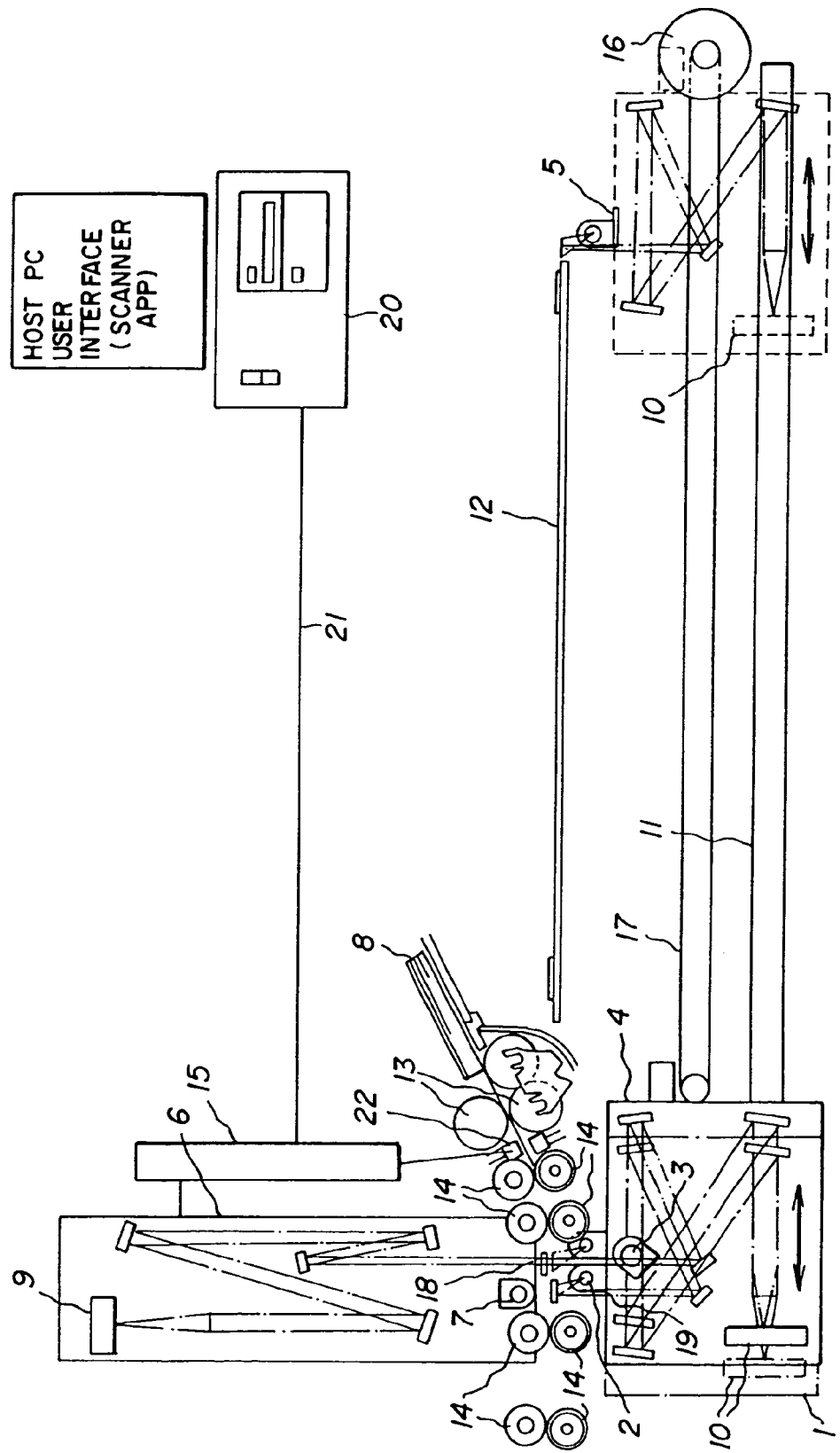
FIG. 1 is a block diagram of the hardware system on which the method of the present invention would be implemented.

The present invention will be directed in particular to elements forming part of, or in cooperation more directly with, an overall scanning apparatus. It is to be understood that elements not specifically shown or described may take various forms well known to those skilled in the art. For example, this would include a paper path composed of an input tray capable of holding a stack of documents 8, and a set of feed rollers 13 to separate and engage a single document with a set of nip rollers 14 to move in a controlled manner the separated document past the upper 6 and lower 1 cameras. The upper 6 and lower 1 cameras capture in the duplex mode a set of digital data for each side of the document by reflecting light from an upper light source 7 and a lower light source 2 to an upper CCD 9 and a lower CCD 10 on the same side of the document, respectively, in order to capture the image. The image would be processed by the embedded controller 15 and communicated to the host PC 20 via the host interface 21. When in the mode for scanning transparent objects, the light source must be located on the opposite side of the document from the CCD which captures the image. This invention describes a unique method and implementation to provide a apparatus the ability to scan both transparent and opaque documents on the same device without requiring significant additional cost.

Referring now to FIG. 1, when duplex reflective scanning is to be performed the lower camera 1, with its light source 2 and CCD sensor 10, is positioned opposite the upper camera 6, with its light source 7 and CCD sensor 9 so that the light source 7 from the upper camera 6 is offset from the aperture 19 of the lower camera 1 and the light source 2 from the lower camera 1 is offset from the aperture 18 of the upper camera 6. An embedded controller 15 then operates the document feed rollers 13 and nip rollers 14, detects documents in the rollers with document sensor 22 while controlling and coordinating the upper camera 6 and lower camera 1 apparatus to capture a digital image of an opaque document one per side to perform the duplex reflective scanning operation.

In order to perform a transparency scanning, an embedded controller 15, which may be actuated by multiple means described below would actuate a motor 16 connected to the lower camera 1 by drive belt 17 in order to move the lower camera 1 along the axis of the polished rod 11 away from the reflective scanning position 1 towards the transparency scanning position 4 and position or tilt the lower cameras light source 2 for scanning the transparency through the aperture 18 of the upper camera 6. During this operation, the embedded controller 15 would turn off upper light source 7 on the upper camera 6 and the lower cameras light source 2 would be turned on to transmit light through the transparent document being scanned. The transparencies image would be captured by the upper cameras CCD 9 and processed by the embedded controller 15 and communicated to the host PC 20 via the host interface 21.

The scanning apparatus of the invention is in normal use configured to be in the duplex reflective scanning mode, that is the lower camera 1 is positioned offset from and beneath the upper camera 6. When in this duplex scanning mode, the controller causes operation of both the upper and lower cameras, including their respective upper and lower light sources and CCDs. Entering the transparency scanning mode from the reflective mode can be triggered by a unique, detectable image, e.g. scannable patch, on the document prior to each transparency which upon being fed through the feed rollers 13 and nip rollers 14, past sensor 22 and imaged by the camera CCDs 9 and 10 will provide a digital representation of the unique image which when processed and detected by the embedded controller 15 causes it to actuate a motor to move the lower camera from the offset reflective scanning position 1 to a position 4 beneath the upper camera 6 aligning the lower cameras light source 2 with the upper cameras aperture 18, and to position or tilt the lower camera light source 2 to position 3 and to switch off the upper cameras light source 7 to enable scanning of the next document as a transparency. The controller would also cause operation of the upper camera CCD 9 and lower camera light source 2 to capture the digital representation of the transparency as it is processed. As an alternative, a switch provided by a selection from the user interface of a host application 20 which communicates via the host interface 21 with the embedded controller 15 can be provided on the duplex scanning apparatus to select either the duplex or transparency scanning operations which, depending upon the user interface selections 20, would cause the embedded controller 15 to operate the duplex scanning apparatus in the duplex or transparency scanning mode described above.

In order to return to the reflective scanning mode from the transparency scanning mode, a unique, detectable image, can be placed upon the transparent document immediately prior to the document to be reflectively scanned which upon being fed through the feed rollers 13 and nip rollers 14, past sensor 22 and then imaged by the camera CCDs 9 and 10 will provide a digital representation of the unique image which when processed and detected by the embedded controller 15 causes it to actuate a motor to return the lower camera from the aligned transparency scanning position 4 to the offset reflective scanning position 1 beneath the upper camera 6, and to re-position or tilt the lower camera light source 2 to the reflective scanning position. The controller 15 would switch on the upper cameras light source 7, and cause operation of the camera CCDs 9 and 10 and lower camera light source 2 to enable scanning of the next document in the duplex scanning mode.

In another embodiment contemplated by the invention, the duplex scanning apparatus can be used in a simplex scanning mode, that is, the lower camera 1 can actuated and moved for simplex scanning of a document. The simplex scanning operation can be performed by a selection from the user interface of a host application 20 which communicates via the host interface 21 with the embedded controller 15 to operate the motor 16 to move the lower camera 1 from the duplex or transparency scanning position along the polished rod 11 beneath a glass platen 12 while the lower camera 1 is operating. The embedded controller 15 would also disable the upper camera 6 during this simplex scanning operation. As an alternative to a switch for selecting the simplex scanning operation, a means to sense placement of a document on the glass platen 12 can be provided so that upon sensing a document the embedded controller 15 would be actuated as described above.

The invention has been described in detail with particular reference to certain preferred embodiments thereof, but it will be understood that variations and modifications can be effected within the scope of the invention.

PARTS LIST

1 Lower camera in duplex reflective scanning position
2 Lower camera light source in duplex reflective scanning position
3 Lower camera light source in transparency scanning position
4 Lower camera in transparency scanning position
5 Lower camera in reflective platen scanning end of scan position
6 Upper camera used to capture upper duplex image or transparency image
7 Upper camera light source for reflective scanning
8 Document stack
9 Upper camera CCD
10 Lower camera CCD
11 Polished rod
12 Platen glass
13 Feeder
14 Nip rollers
15 Embedded microprocessor based controller
16 Platen lower camera motor
17 Lower camera drive belt
18 Upper camera aperture
19 Lower camera aperture
20 Host PC running a scanner application with user interface
21 Host interface typically SCSI
22. Document present sensor

What is claimed is:

1. A document scanner for performing a duplex or a transparency scanning operation comprising:
   a first camera including a first light source and a first aperture;
   an opposed second camera including a second light source and a second aperture, wherein each aperture of each camera is offset from the light source of the oppositely positioned camera during duplex scanning;
   a motor for moving said second camera from a first position for duplex scanning to a second position for transparency scanning;
   a controller for sending a drive signal to said motor to cause said motor to move said second camera from said first position to said second position when a transparency scanning mode is selected; and
   wherein said controller, during movement of the second camera from the first duplex scanning position to the second transparency scanning position, moves the second light source from a first offset position for duplex scanning to a second position aligned with the first aperture of the first camera to enable transparency scanning.

2. A document scanner as in claim 1 wherein said controller switches said first light source off when said transparency scanning mode is selected.

3. A document scanner as in claim 2 wherein said controller activates the first camera and the second light source when said transparency scanning mode is selected.

4. A document scanner as in claim 1 further comprising a sensor wherein the sensor is adapted to detect a patch on a document prior to a transparent document or set of transparent documents to be scanned and send a signal to said controller which switches said scanner from a duplex scanning mode to said transparency scanning mode to enable transparency scanning of the following transparent document or set of transparent documents.

5. A document scanner as in claim 4, wherein the sensor is adapted to detect a patch on a transparent document prior to a document or set of documents to be scanned in the duplex scanning mode, and send a signal to said controller which switches said scanner from said transparency scanning mode to said duplex scanning mode to enable duplex scanning of the following document or set of documents.

6. A document scanner as in claim 1 further comprising a switch connected to the controller to enable a user to select a simplex, duplex or transparency scanning mode.

7. A document scanner as in claim 6 wherein said controller further sends a drive signal to said motor to cause said motor to move said second camera from said first position or said second position to a third position for simplex scanning when a simplex scanning mode is selected.

8. A document scanner as in claim 7 wherein said controller further switches said first camera off and switches the second camera on while moving the second camera during said simplex scanning mode.

9. A document scanner as in claim 7 further comprising a glass platen to receive a document for simplex scanning wherein the controller sends a drive signal to the motor to cause said motor to move said second camera from said first position or said second position along a surface of said platen and activates said second camera when said simplex scanning mode is selected.

10. A document scanner for performing a duplex or a transparency scanning operation comprising:
  a first camera having a first light source;
  an opposed second camera including a second light source and a second aperture, wherein each aperture of each camera is offset from the light source of the oppositely positioned camera during duplex scanning;
  a motor for moving said second camera from a first position for duplex scanning to a second position for transparency scanning and for tilting said second light source from a first position for duplex scanning to a second position for transparency scanning;
  a controller for sending a drive signal to said motor to cause said motor to move said second camera from said first position to said second position and to move said second light source from said first position for duplex scanning to said second position for transparency scanning when a transparency scanning mode is selected; and
  wherein said controller, during movement of the second camera from the first duplex scanning position to the second transparency scanning position, moves the second light source from a first offset position for duplex scanning to a second position aligned with the first aperture of the first camera to enable transparency scanning.

11. A document scanner as in claim 10 wherein said controller switches said first light source off when said transparency scanning mode is selected.

12. A document scanner as in claim 11 wherein said controller activates the first camera and the second light source when said transparency scanning mode is selected.

13. A document scanner as in claim 10 further comprising a sensor wherein the sensor is adapted to detect a patch on a document prior to a transparent document or set of transparent documents to be scanned and send a signal to said controller which switches said scanner from a duplex scanning mode to said transparency scanning mode to enable transparency scanning of the following transparent document or set of transparent documents.

14. A document scanner as in claim 10 further comprising a switch connected to the controller to enable a user to select a simplex, duplex or transparency scanning mode.

15. A document scanner as in claim 14 wherein said controller further sends a drive signal to said motor to cause said motor to move said second camera from said first position for duplex scanning or said second position for transparency scanning to a third position for simplex scanning and to tilt the second light source when in the second position for transparency scanning to a third position for simplex scanning when simplex scanning is selected.

16. A document scanner as in claim 15 wherein said controller further switches said first camera off and activates the second camera when said simplex scanning mode is to be performed.

17. A document scanner as in claim 15 further comprising a glass platen to receive a document for simplex scanning wherein the controller sends a drive signal to the motor to cause said motor to move said second camera from said first position for duplex scanning or said second position for transparency scanning along a surface of said platen and activates said second camera when said simplex scanning mode is selected.

* * * * *